May 17, 1966  V. R. NILSSON  3,251,377
FLOW CONTROLLER

Filed Dec. 17, 1963  4 Sheets-Sheet 1

INVENTOR.
Vilgot Raymond Nilsson
BY
Davis, Hoxie, Faithfull & Hapgood
attorneys

May 17, 1966 V. R. NILSSON 3,251,377

FLOW CONTROLLER

Filed Dec. 17, 1963 4 Sheets-Sheet 2

INVENTOR.
Vilgot Raymond Nilsson
BY
Davis, Hopie, Faithfull & Hapgood
Attorneys

May 17, 1966  V. R. NILSSON  3,251,377
FLOW CONTROLLER
Filed Dec. 17, 1963  4 Sheets-Sheet 3
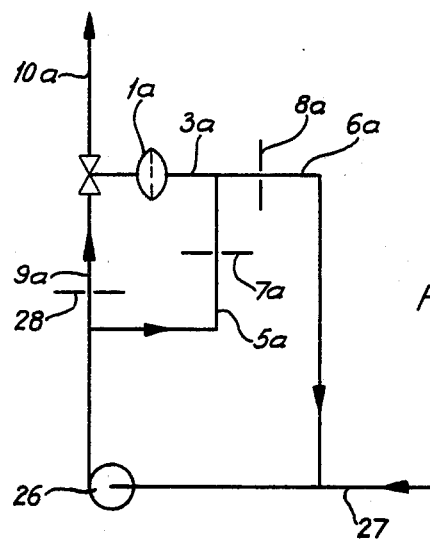
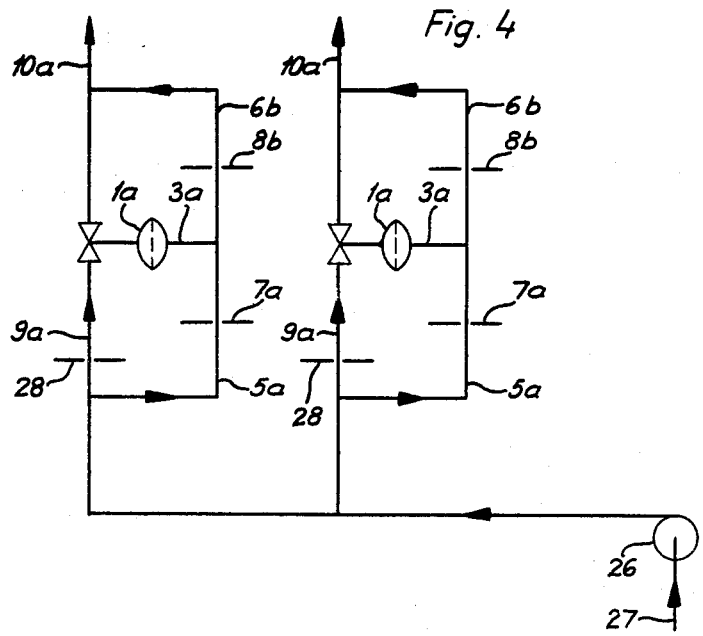
INVENTOR.
Vilgot Raymond Nilsson
BY
Davis, Hoxie, Faithfull + Hapgood.
Attorneys

United States Patent Office 3,251,377
Patented May 17, 1966

3,251,377
FLOW CONTROLLER
Vilgot Raymond Nilsson, Hägersten, Sweden, assignor to Aktiebolaget Separator, Stockholm, Sweden, a corporation of Sweden
Filed Dec. 17, 1963, Ser. No. 331,169
Claims priority, application Sweden, Dec. 18, 1962, 13,620/62
15 Claims. (Cl. 137—501)

The present invention relates to an improved valve of the type which, between the inlet and the outlet of the valve housing, is provided with a valve seat opening and a valve body co-operating with said valve seat opening. The invention further relates to a flow controller provided with the valve.

The invention has for its principal object to provide a valve in which a balance essentially prevails between the forces which act upon the valve body in its direction of motion. The new valve is characterized in that it is provided with a chamber directly in front of the valve body, which chamber is intended to be subjected to a pressure which acts as a force and actuates the valve body in closing direction, and in that the valve body, irrespective of the position it takes in operation in relation to the valve seat, is always subjected in an opposite direction to a force of essentially the same strength from the pressure ahead of the valve seat, considered in the direction of flow.

It has been established that a valve of this type can be used with advantage for various purposes, as for obtaining a constant pressure, a constant quantity ratio, or a constant quantity per unit of time.

A preferred embodiment of the new valve is characterized in that the chamber is tightly separated from the rest of the valve housing by means of a movable partition with two opposite surfaces, the part of each surface which is moving during operation having the same area as the other part, and in that the area of the valve seat opening is as large as the area of one of said movable surface parts.

Such a movable partition may, for example, be constituted by a piston. The piston may at the same time serve as a valve body.

The friction between the piston and the surfaces against which it glides counteracts the sensitivity of the device. According to the invention, a diaphragm is therefore preferred as the movable partition, the diaphragm being preferably made of an easily deformable, resilient material, such as rubber or plastic. The valve body may thus constitute one piece with the diaphragm. According to the invention, it is preferred to use a valve body which is loosely inserted between the valve seat and the diaphragm, more particularly in such way that said diaphragm always lies against the valve body so that said valve body and the diaphragm always follow each other in their movement. Thus, sensitivity of the device is maintained.

In operation, the valve is intended to work with a higher pressure in the aforementioned chamber than in that part of the valve housing which constitutes the outlet side of the valve seat. In order to provide, under the above conditions, the same area on both opposite surfaces of the diaphragm which are moving in operation, a ring-shaped surface has been arranged according to the invention, which surface surrounds the valve body concentrically and supports a corresponding part of the diaphragm against the pressure from the chamber.

Contrary to what has previously been considered preferable, according to the present invention the ratio between the diameter of the valve seat opening and the travel of the movable partition should be high, that is, greater than 10:1. As a result, a great change of the through-flow area of the valve is obtained for a small movement of the valve body. That is, the valve body rapidly takes up a new balance position. In order to avoid vibration of the diaphragm at a high frequency, the valve body should have a certain motion inertia, (a certain mass). For this purpose, it is desirable to give the valve body a weight corresponding to 10 to 30 g., preferably about 20 g./cm.$^2$ of the area of the valve seat opening.

The invention also relates to a flow controller provided with the new valve. The new flow controller is intended to maintain a constant flow (a constant quantity per unit of time) in a pipe. It is characterized by comprising a first pipe in which are fitted, as counted in the direction of flow, a pump with a reflux between its pressure side and its suction side, a throttling member and the aforementioned valve. That part of the valve housing provided with an inlet and an outlet constitutes a part of the flow path through said pipe, and a second pipe is branched off from the first pipe at a point between the pump and the throttling member and opens into the valve housing chamber, a throttling member being provided in this second pipe. The housing chamber, by way of a third pipe in which a throttling member is provided, communicates with a point having a lower pressure than the pressure at the outlet side of the last-mentioned throttling member. The controller may be associated with a pump in the form of a centrifugal pump, a liquid-ring pump, or a gear pump with a permanently open return piping between the pressure side and the suction side.

If the liquid flowing through the flow controller is cheap (such as water), the third pipe may open into a drain. If on the contrary the liquid is valuable, the liquid flowing through the third pipe is recovered by arranging the latter pipe to open into the first pipe. According to one embodiment, the third pipe may open into the first pipe after the valve, as seen in the flow direction, in which case a spring-loaded valve is used as a throttling member in the second pipe, which valve ensures a constant pressure drop through the throttling member. In the latter embodiment, pressure variations at the pressure side of the pump having a disadvantageous influence on the accuracy of the controller as far as the maintaining of a constant flow is concerned. Consequently, in another preferred embodiment, the third pipe opens into the first pipe ahead of the pump, as seen in the flow direction. In the latter embodiment the disadvantageous influence of said pressure variations is eliminated.

If at least one of the throttling members ahead of the valve, as seen in the direction of flow, is adjustable, it is possible to adjust the flow through the first pipe to the required valve by means of said throttling member.

The invention is explained more in detail below, reference being made to the attached drawings in which:

FIG. 3 is a schematic view of a flow control system embodying a flow controller valve according the invention;

FIG. 4 is a schematic view of a modified form of the system shown in FIG. 3.

Figure 1:
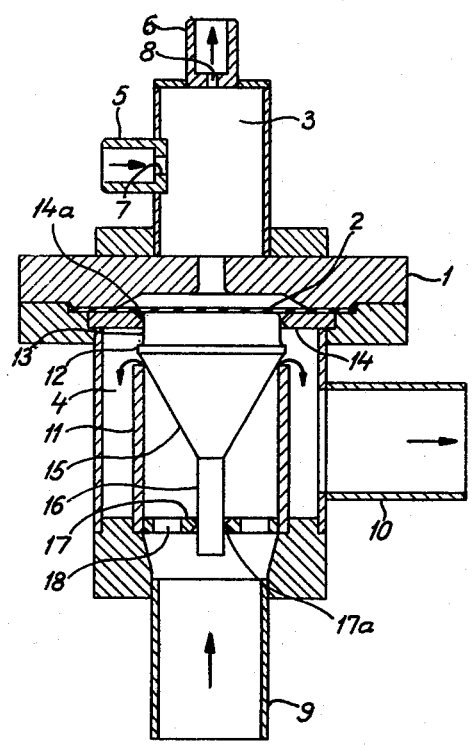
FIG. 1 is a vertical sectional view of a flow control valve made according to the invention.

In FIG. 1, reference numeral 1 designates the valve housing proper. A rubber diaphragm 2 divides said housing into an upper chamber 3 and a lower chamber 4. The upper chamber is provided with an inlet 5 and an outlet 6. The former is provided with a throttle 7, and the latter with a throttle 8. The lower chamber 4 is provided with an inlet 9 and an outlet 10. Further, a valve seat in the form of a cylinder 11 is arranged in the lower chamber. A valve body 12 is provided at the upper open end of cylinder 11. The diaphragm 2 rests against the upper end of valve body 12. The cross sectional area of the hollow space of the cylinder 11 is as large as the area of the contact surface between the valve body 12 and the diaphragm 2. The upper part 13 of the valve body is cylindrical and centrally guided by a ring-shaped disk 14 with an edge-like inner rim 14a. The valve body has a conical part 15 resting against the valve seat. The lower part of the valve body comprises a spindle 16 which is centrally guided by a ring-shaped disk 17 with an edge-like inner rim 17a. Holes 18 are provided in the disk 17 in order to admit liquid inside the cylinder 11. The operation of the valve will be described presently.

Figure 2:
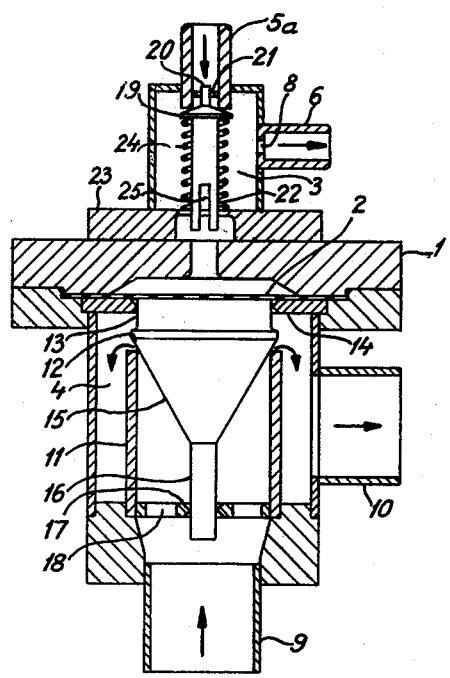
FIG. 2 is a similar view of a modified form of the valve.

In the valve of FIG. 2, the lower portion up to part 1 is similar to the valve of FIG. 1. However, in the valve of FIG. 2, the fixed throttle 7 of FIG. 1 is replaced by a spring-loaded valve comprising a valve body 19 coacting with a seat at the lower end of inlet tube 5a. Valve body 19 has an upper spindle 20 guided in the center of a disk 21 secured in the inlet tube 5a. The valve body 19 is further provided with a lower spindle 22 which is guided in a central hole in a plate 23. A helical spring 24 surrounding the spindle 22 tends to press the body 19 upwards against its seat. A slot 25 which extends diametrally through the lower end of the spindle 22 ensures a communication between upper chamber 3 and the space immediately above the diaphragm 2. The spring 24 ensures that the valve 19 maintains a constant pressure drop between the inlet 5a and the chamber 3.

In FIG. 3, reference numeral 10a designates the pipe through which a liquid (e.g. oil) is to flow at a constant rate. The controller comprises a centrifugal pump 26 and a valve 1a of the kind shown in FIG. 1, having outlet throttle 8a opening into outlet duct 6a. The suction line of the pump 26 is designated by reference numeral 27 and the outlet pipe of the pump ahead of the valve 1a is designated by reference numeral 9a. A throttling member 28 is fitted in the latter pipe. A pipe 5a in which is fitted a throttling member 7a is branched off from the pipe 9a. At least one of the throttling members 7a and 28 is supposed to be an adjustable throttling valve. Reference numeral 3a corresponds to the chamber 3 above the valve diaphragm 2 in FIG. 1. From the chamber 3a, the pipe 6a having the throttling member 8a leads back to the suction side of the pump 26.

In the operation of the controller, the pump 26 feeds oil from the pipe 27 to the throttling member 28. Beyond this throttling member (under the valve body 12 of FIG. 1) occurs a lower pressure due to the pressure drop in the throttling member 28, which lower pressure tends to lift the valve body 12 upwards. The pump pressure is also transmitted through the pipe 5a and the throttling member 7a to the chamber 3a (3 in FIG. 1) where a lower pressure likewise occurs. The pressures under the valve seat (within cylinder 11 in FIG. 1) and in the chamber 3a are adjusted so as to be practically alike but higher than the pressure in the chamber 4 (FIG. 1). Accordingly, the diaphragm 2 will always remain pressed against the ring-shaped disk 14 so that only that part of the diaphragm which exactly covers the top side of the valve body 12 will move simultaneously with said valve body. Since the valve seat opening (upper end of cylinder 11) and the top side of the valve body (upper end of part 13) have the same area, the valve body will be permanently subjected to upward and downward forces which are of the same intensity and therfore balance each other. As the existing pressures rise, for example, to 8 to 10 kg./cm.², and act upon the valve body with corresponding forces, it is in practice possible to disregard the influence of the weight of the valve body. Due to the design of the valve, variations in the counterpressure in the outlet 10 do not influence the valve body in its direction of movement.

Since the diameter of the valve seat opening is large, a great flow rate of liquid is provided for a small movement of the valve body. In case of a disturbance, the diaphragm therefore will very rapidly take up a new position. This means that for a small displacement of the valve body, a large slot area is opened between the valve body and the valve seat. The valve will therefore be very quick-acting as far as control operation is concerned, so that the flow variations will remain small. The rapid vibrations to which the valve body would be subjected due to the short travel length are counteracted by providing the valve body with a suitable weight. Thus, the valve will operate silently.

Owing to the quick-acting characteristic of the valve in connection with the pump type mentioned above, the pressure drop in the throttle 28 will remain constant and thus the quantity of liquid fed through the pipe 10a will remain constant per unit of time. This appears from the following computation, where it is assumed that:

The pressure ahead of 26 (and in 6a) $= P_0$
The pressure ahead of 7a and $28 = P_1 + P_0$
The pressure ahead of 3a and after $28 = P_2$
The pressure drop in 7a and $28 = \Delta P_1$
The through-flow area of 7a $= A_1$
The through-flow area of 8a $= A_2$
The quantity flowing in the circuit formed by the pump 26 and the throttling points 7a and 8a $= Q$
$k =$ a constant $$Q = k \cdot A_1 \sqrt{P_1 + P_0 - P_2}$$

$$Q = k \cdot A_2 \sqrt{P_2 - P_0}$$

$$\therefore 1 = \left(\frac{A_1}{A_2}\right)^2 \cdot \frac{P_1 + P_0 - P_2}{P_2 - P_0}$$

$$P_2 = P_1 + P_0 - \Delta P_1$$

$$\left(\frac{A_1}{A_2}\right)^2 \cdot \frac{\Delta P_1}{P_1 - \Delta P_1} = 1$$

$$\therefore \Delta P_1 = P_1 \frac{A_2^2}{A_1^2 + A_2^2}$$

Since $$\frac{A_2^2}{A_1^2 + A_2^2}$$

$$\frac{A_2^2}{A_1^2 + A_2^2}$$

is constant, $\Delta P_1$ is directly proportional to $P_1$. This means that when $P_1$ is kept constant by the quick-acting valve, the pressure drop in the throttling point 28 will also remain constant and consequently the quantity which is discharged per unit of time through the pipe 10a. Tests have shown that the above computations and conclusions correspond closely with actual practice.

The flow controller according to FIG. 4 employs the valve according to FIG. 2 and is advantageously used when several controllers are fed by one and the same pipe and when, due to installation reasons, it is preferred to lead the liquid fed to the upper chamber 3 of the valve along to a point beyond the valve in the pipe 9a–10a instead of to a point ahead of the pump in the pipe 27 (FIG. 3). The pipe which connects the chamber 3a (3 in FIG. 2) with the outlet side of the valve is designated by reference 6b and the throttling member in said pipe by reference 8b. Owing to the fact that the liquid in the pipe 6b is conveyed to the outlet side of the valve instead of to the suction side of the pump, the control accuracy of the valve is somewhat impaired. If the quantity flowing through the pipe 6b amounts, for example, to 10% of the quantity flowing through the pipe 10a, which is a value encountered in practical operation, said rate can bring about a control error of about ±2%. Such a control error, however, can to a large extent be considered acceptable and must be weighed against higher equipment costs.

Figure 5:
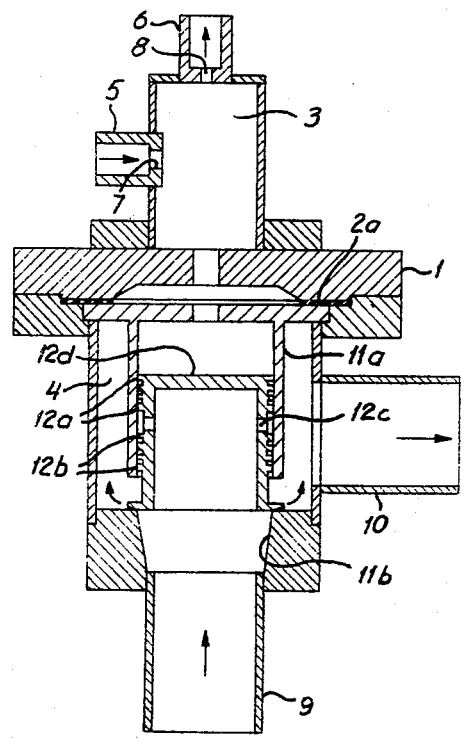
FIG. 5 is a vertical sectional view of still another form of the flow controller or valve.

The valve according to FIG. 5 functions in principle in the same way as the valve according to FIG. 1. In the valve housing 1 there is inserted a sealing ring 2a. The valve body 12d consists of a hollow cylinder closed at its upper end and movable in vertical direction in a cylinder 11a. The area of the opening in the valve seat 11b, which is formed in the bottom of the valve housing, is just as large as the area of the upper side of the valve body 12d. The diaphragm 2 of FIG. 1 is replaced by labyrinth sealings provided at the outside of the valve body. Thus, the valve body will move more easily and act faster than in the case according to FIG. 1, where the rubber diaphragm 2 acts as a brake to a certain degree. The labyrinth sealings consist of an upper group 12a and a lower group 12b. A horizontal ring of holes 12c is provided in the cylindrical wall of the valve body on a level between the two groups of labyrinth sealings. When the valve body 12d does not move, the same pressure is prevailing in its interior as above the upper side of the valve body. Then no leakage takes place at the labyrinth sealings. On the other hand, a small leakage takes place at the sealings 12b, since there is a pressure drop between the inlet 9 and the interior of the valve body 12d on one side and the chamber 4 on the other side. During the control movements of the valve body, however, a certain leakage takes place also at the sealings 12a, whereby a pressure equalization between the upper side and the interior of the valve body is effected.

I claim:

1. A valve comprising a valve housing having an inlet and an outlet, said housing forming a passage including a valve seat affording communication between said inlet and outlet, a valve body movable relative to said seat to control flow through said passage, said housing also forming a chamber opposing the valve body, means movable with the valve body and closing said chamber from said passage, and means connected to said inlet operable to produce in said chamber a pressure acting on said closing means to urge the valve body toward said seat with a force substantially equal to the opposing force exerted on the valve body from said inlet by way of said seat, said closing means including a movable partition having two opposite surfaces, the part of each said surface which is movable with the valve body having the same area as the movable part of the other surface.

2. A valve according to claim 1, in which the valve body is a piston having an end forming said movable closing means.

3. A valve according to claim 1, in which said movable closing means include a diaphragm.

4. A valve according to claim 1, in which said movable closing means include a diaphragm, the valve body being loosely inserted between the valve seat and said diaphragm.

5. A valve according to claim 1, in which said movable closing means include a diaphragm, said diaphragm being made of a deformable and resilient material.

6. A valve according to claim 1, in which said movable closing means include a diaphragm, the housing forming a ring-shaped surface surrounding the valve body and supporting part of the diaphragm against the pressure from said chamber.

7. A valve according to claim 1, in which said seat defines an opening having a predetermined diameter, said movable closing means having a maximum travel less than ten times said diameter.

8. A valve according to claim 1, in which said seat defines an opening of predetermined area, said valve body being of a weight which is 10 to 30 grams per square centimeter of said opening area.

9. A valve according to claim 1, in combination with a first pipe leading to said housing inlet, a pump in said first pipe, said pressure producing means including a second pipe leading to said housing chamber from said first pipe at a point thereof between the discharge side of said pump and said housing inlet, a flow throttle located in said first pipe between said point and said housing inlet, a flow throttle in said second pipe, a third pipe leading from said housing chamber to the inlet side of said pump, and a flow throttle in said third pipe.

10. A valve according to claim 1, in combination with a first pipe leading to said housing inlet, a pump in said first pipe, said pressure producing means including a second pipe leading to said housing chamber from said first pipe at a point thereof between said pump and said housing inlet, a flow throttle located in said first pipe between said point and said housing inlet, a flow throttle in said second pipe, a third pipe leading from said housing chamber, and a flow throttle in said third pipe, said third pipe leading to said first pipe at the inlet side of said pump.

11. A valve according to claim 1, in combination with a first pipe leading to said housing inlet, a pump in said first pipe, said pressure producing means including a second pipe leading to said housing chamber from said first pipe at a point thereof between said pump and said housing inlet, a flow throttle located in said first pipe between said point and said housing inlet, a flow throttle in said second pipe, a third pipe leading from said housing chamber, a flow throttle in said third pipe, and a discharge pipe leading from said housing outlet, said third pipe leading to said discharge pipe.

12. The combination according to claim 11, in which the flow throttle in said second pipe is a spring-loaded valve.

13. A valve according to claim 1, in which the valve body is a piston having an end forming said movable closing means, the housing including a cylinder in which the piston is slidable, said piston including labyrinth means sealing against the inside of the cylinder.

14. A valve according to claim 1, in which the valve body is a piston having an end forming said movable closing means, the housing including a cylinder in which the piston is slidable, said piston including labyrinth means sealing against the inside the cylinder, the piston being a hollow cylinder closed at said piston end.

15. A valve according to claim 1, in which the valve body is a piston having an end forming said movable closing means, the housing including a cylinder in which the piston is slidable, said piston including labyrinth means sealing against the inside of the cylinder, the piston being a hollow cylinder closed at said piston end, said labyrinth means forming two labyrinth groups spaced from each other in the direction of the piston movement, the cylindrical wall of the piston being perforated in the area between the two labyrinth groups.

References Cited by the Examiner

UNITED STATES PATENTS

| | | | |
|---|---|---|---|
| Re. 24,410 | 12/1957 | Drake | 137—100 |
| 2,909,191 | 10/1959 | Horton | 137—501 |
| 2,990,847 | 7/1961 | Absalon | 137—501 X |
| 3,028,876 | 4/1962 | Gratzmuller | 137—501 |
| 3,097,664 | 6/1963 | Henley | 137—487 |
| 3,100,620 | 8/1963 | Kates | 137—501 X |

MARTIN P. SCHWADRON, *Acting Primary Examiner.*